(12) United States Patent
Kartalov

(10) Patent No.: US 12,398,279 B2
(45) Date of Patent: Aug. 26, 2025

(54) DEPTH-INDEPENDENT BLAST-RESISTANT THERMALLY-INSULATING BALLISTICALLY-PROTECTIVE AND ERGONOMICALLY-IMPROVED SEGMENTED DIVER SUIT

(71) Applicant: The United States of America, as represented by the Secretary of the Navy, Arlington, VA (US)

(72) Inventor: Emil Paskalev Kartalov, Pacific Grove, CA (US)

(73) Assignee: The United States of America, as Represented by the Secretary of the Navy, Arlington, VA (US)

( * ) Notice: Subject to any disclaimer, the term of this patent is extended or adjusted under 35 U.S.C. 154(b) by 637 days.

(21) Appl. No.: 17/828,595

(22) Filed: May 31, 2022

(65) Prior Publication Data
US 2022/0386714 A1    Dec. 8, 2022

Related U.S. Application Data

(60) Provisional application No. 63/194,767, filed on May 28, 2021.

(51) Int. Cl.
*C09D 7/40* (2018.01)
*A41D 13/012* (2006.01)
(Continued)

(52) U.S. Cl.
CPC ............. *C09D 7/70* (2018.01); *A41D 13/012* (2013.01); *B32B 25/02* (2013.01); *B32B 25/20* (2013.01); *B33Y 50/00* (2014.12); *B33Y 80/00* (2014.12); *B63C 11/04* (2013.01); *C08K 7/18* (2013.01); *C09D 7/61* (2018.01); *C09D 183/04* (2013.01); *A41D 2400/10* (2013.01);
(Continued)

(58) Field of Classification Search
CPC ... B63C 11/00; B63C 11/04; B63C 2011/046; B63C 11/10; B32B 25/02; B32B 25/20; B32B 2264/101; B32B 2264/2032; B32B 2264/303; B32B 2307/56; B32B 2437/00; B32B 2571/02; B32B 25/16; B32B 27/08; B32B 27/283; B32B 2250/44; B32B 2264/107; B32B 3/04; B32B 2307/10; B32B 3/18; B32B 3/263; B32B 25/08; B32B 27/40; B32B 2250/24; B32B 2307/30; B32B 7/12; B32B 27/18; B32B 27/28; B33Y 50/00; B33Y 80/00; B33Y 70/10; C09D 7/70; C09D 7/61; C09D 183/04; C09K 7/18; C08G 77/04; C08K 7/28; C08K 7/18; C08L 83/04; C08L 75/04; C08L 75/02; A41D 13/012; A41D 2400/10; A41D 13/015; F41H 5/0492; F41H 1/02
USPC ........................................... 405/186; 441/102
See application file for complete search history.

(56) References Cited

U.S. PATENT DOCUMENTS 11,965,492 B1 * 4/2024 Hansen ................. D03D 15/00

* cited by examiner

*Primary Examiner* — Daniel V Venne
(74) *Attorney, Agent, or Firm* — Scott Bell; Heber Martin Carbajal Chavez

(57) ABSTRACT

A segmented diving suit includes a base layer and a plurality of composite plates arranged on the base layer in a configuration designed to avoid joints or other anatomical features that bend. The composite plates include a spheres or microspheres dispersed/embedded in a carrier polymer. The spheres or microspheres provide one or more of thermal protection, sonic/blast resistance, and ballistic protection.

20 Claims, 7 Drawing Sheets

(51) Int. Cl.
  *B32B 25/02*    (2006.01)
  *B32B 25/20*    (2006.01)
  *B33Y 50/00*    (2015.01)
  *B33Y 80/00*    (2015.01)
  *B63C 11/04*    (2006.01)
  *B63C 11/10*    (2006.01)
  *C08K 7/18*     (2006.01)
  *C09D 7/61*     (2018.01)
  *C09D 183/04*   (2006.01)
  *F41H 5/04*     (2006.01)

(52) U.S. Cl.
  CPC .  *B32B 2264/101* (2013.01); *B32B 2264/2032* (2020.08); *B32B 2264/303* (2020.08); *B32B 2307/56* (2013.01); *B32B 2437/00* (2013.01); *B32B 2571/02* (2013.01); *B63C 11/10* (2013.01); *F41H 5/0492* (2013.01)

DEPTH-INDEPENDENT BLAST-RESISTANT THERMALLY-INSULATING BALLISTICALLY-PROTECTIVE AND ERGONOMICALLY-IMPROVED SEGMENTED DIVER SUIT

CROSS-REFERENCE TO RELATED APPLICATIONS

The present application claims priority to U.S. Provisional Patent Application Ser. No. 63/194,767, filed May 28, 2021, which is incorporated by reference herein in its entirety.

BACKGROUND

Heat loss is a major health hazard facing divers, particularly during long dives in cold waters, and can lead to hypothermia, organ damage, unconsciousness, and eventually death. Compared to air, sea water has about 24 times greater thermal conductivity and about four times greater specific heat capacity. As a result, the human body loses heat to the ambient water approximately 27 times faster than in air at the same temperature difference. That heat loss means hypothermia occurs much more rapidly in submerged humans. As the diver's core temperature declines, the diver runs the risk of organ damage, loss of consciousness, and eventually death. It takes about 1 hour in 50° F. water or about 15 minutes in 40° F. water for an unprotected lean human to reach hypothermia. Even extensively trained, professional, physiologically conditioned naval divers cannot fully compensate for the heat loss. Hence, thermal protection is critical, particularly in longer dives and in cold waters.

The most common form of diver thermal protection is a wetsuit comprised of neoprene (also known as polychloroprene) encased between two thin layers of cloth (0.5-1 mm thick). During fabrication, the neoprene is "bubbled" with air or nitrogen to form microscopic pockets (called "cells"), which provide the thermal insulation and mechanical flexibility to the suit. Protected by a neoprene wetsuit, a lean diver in 40° F. water would reach hypothermia in about 1 hour in a 3 mm suit and in about 1.5 hours in a 5 mm suit. These are certainly significant improvements over the about 15 minutes without a suit. However, the increased protection only delays the onset of hypothermia, while thicker neoprene suits are less flexible and so fatigue the diver faster. Colder waters require more protection, which neoprene can provide mostly by further increasing its thickness. However, this comes at the expense of ergonomics. A thick neoprene suit is typically 7 mm or 8 mm thick, which significantly decreases the flexibility of the suit compared to a 2 mm or 3 mm suit. As a result, the diver has to expend significant effort to swim, thereby increasing fatigue and decreasing ergonomics. As a result of this tradeoff between protection and ergonomics, commercial neoprene suits do not exceed 8 mm in thickness.

Furthermore, the air bubbles in the neoprene are easily compressible, so the insulation is significantly reduced as depth and ambient pressure increase. For example, neoprene loses about 50% of its thermal insulation at 100 FSW. In essence, increased depth produces a combined effect of a colder environment and decreased thermal protection from the shrinking neoprene, leading to hastened heat loss.

Underwater sound is a result of vibrations and pressure fluctuations in the water. The compressional nature of sound waves means that sounds underwater travel much farther and faster than they otherwise would in air due to an increased density of the surrounding medium. Because of this, energy is transferred at a greater rate through the water, yielding a louder sound than what would be received in air. A diver's exposure limits become extremely important when faced with modernized diver deterrence techniques, such as swimmer neutralization equipment or active sonar systems. It would be desirable to develop new diving suits with enhanced sonic and/or blast protection.

There is also demand for ballistically-protected diving suits.

The ergonomic diving suits of the present disclosure provide beneficial thermal properties, sonic/blast resistance, and/or ballistic protection.

BRIEF DESCRIPTION

The present disclosure relates to a segmented ergonomic diving suit with improved thermal resistance, sonic/blast resistance, and/or ballistic protection.

Disclosed, in some embodiments, is a segmented diving suit including: a base layer; a plurality of composite plates; and a plurality of cover layers, each cover layer being associated with one composite plate of the plurality of composite plates. Each composite plate is located between the base layer and one cover layer of the plurality of cover layers, and each composite plate includes: a first composite layer containing hollow glass microspheres dispersed in a first carrier polymer. ach composite plate of the plurality of composite plates is arranged to avoid covering joints of a diver.

The first carrier polymer may include a siloxane-containing polymer, a polyurethane, or a polyurea.

In some embodiments, the first carrier polymer is a silicone polymer.

Each composite plate may further include: a second composite layer located between the cover layer and the first composite layer. The second composite layer includes ceramic spheres dispersed in a second carrier polymer.

In some embodiments, the first carrier polymer and the second carrier polymer are the same.

The second composite layer may further include hollow glass microspheres.

In some embodiments, each composite plate further includes: a third composite layer located between the cover layer and the second composite layer, the third composite layer containing ceramic microspheres dispersed in a third carrier polymer.

The first carrier polymer, the second carrier polymer, and the third carrier polymer may be the same.

In some embodiments, the base layer and the cover layer include neoprene; and a perimeter of the cover layer is secured to the base layer via an adhesive.

A central portion of the composite plate may be thicker than an edge of the composite plate.

Disclosed, in other embodiments, is a segmented diving suit including: a base layer; and a plurality of composite plates, each composite plate including at least one composite layer containing spheres and/or microspheres embedded in a carrier polymer. Each composite plate of the plurality of composite plates is arranged to avoid covering joints of a diver.

The microspheres may be hollow glass microspheres.

In some embodiments, the hollow glass microspheres are filled with a composition including nitrogen, air, or a noble gas.

The microspheres may be ceramic microspheres.

In some embodiments, the spheres are ceramic spheres.

The first carrier polymer may be a siloxane-containing polymer, a polyurethane, or a polyurea.

Disclosed, in further embodiments, is a process for producing a segmented diving suit. The process includes three-dimensionally scanning a diver; image processing images produced during the three-dimensional scanning; forming a plurality of composite plates designed along anatomical lines of the diver; and securing the composite plates to a base layer. Each composite plate of the plurality of composite plates includes: a first composite layer containing hollow glass microspheres dispersed in a first carrier polymer.

The composite plates may be secured to the base layer by adhesively securing a plurality of cover layers to the base layer, each cover layer being associated with one of the plurality of composite plates.

In some embodiments, the composite plates are formed via 3D printing.

Each composite plate may further include: a second composite layer located between the cover layer and the first composite layer, the second composite layer including ceramic spheres dispersed in a second carrier polymer; and a third composite layer located between the cover layer and the second composite layer, the third composite layer including ceramic microspheres dispersed in a third carrier polymer.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
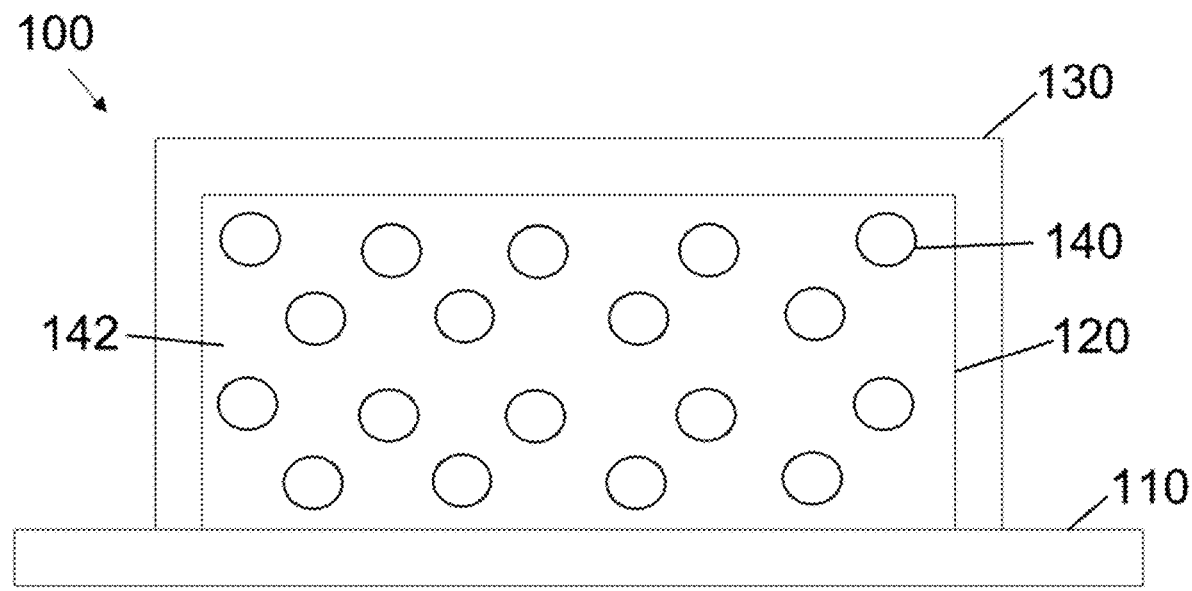
FIG. 1 is a cross-sectional view of a portion of a diving suit in accordance with some embodiments of the present disclosure.

The present disclosure may be understood more readily by reference to the following detailed description of desired embodiments included therein, the drawings. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a segmented diving suit. The suit includes a base layer as a body glove and composite-containing plates attached to the base layer. The composite pieces may be cast in molds or 3D printed directly, in a shape and pattern corresponding to the body of the diver. Segmentation lines between the composite pieces are chosen to follow the areas of maximal bending of the human body, e.g., around joints or between major muscle groups, as dictated by human anatomy. The combination of judicious segmentation, high-quality fitting (e.g., by 3D scans of the user), thin material at the joints etc., and reasonable tradeoff between protection and ergonomics, results in an ergonomically superior suit.

The diving suit may enable improved thermal resistance, improved thermal insulation, improve sonic/blast resistance, improved ballistic protection, and/or improved ergonomics compared to conventional suits. Thermal protection of the suit may surpass that of a neoprene suit of the same thickness, by use of hollow glass microspheres embedded in a carrier polymer. When spheres and/or microspheres are described herein as being embedded or dispersed in a carrier polymer, it should be understood that their distribution may be homogenous or heterogenous. As the microspheres are essentially incompressible, while bubbled neoprene shrinks under pressure, the described suit offers depth-independent thermal protection. The suit may alternatively or additionally include a layer of solid or hollow ceramic microspheres, embedded in the same or a different carrier polymer. The density mismatch between the ceramics and the water produces a mechanical impedance mismatch, which leads to partial reflection of incident sound waves away from the wearer, granting partial sonic blast resistance. The suit may alternatively or additionally include large spheres of ballistically-resistant ceramics, which grant the wearer partial ballistic protection against rounds from small arms. The suit is also ergonomically improved compared to neoprene suits of the same thickness, because the protective plates are segmented along anatomical lines, allowing for thinner material at the places of significant bending. All of these features may be present at the same time in the same suit, with associated high significance for navy divers, special forces, professional divers, and recreational divers.

The composite material may be less flexible than neoprene, and so cannot be simply tailored like cloth. Segmented plates of the composite cover body areas that do not bend (e.g., major bones and parts of the ribcage), while areas of significant bending (e.g., joints) are left to a thin base layer (e.g., neoprene). The resulting suit outperforms a 7 mm neoprene suit in both thermal insulation (+7° F. temperature difference) and ergonomics (comparable to 3 mm neoprene), producing the best of both worlds.

Typically, divers tend to have excessive buoyancy due to the large added volume of gas tanks filled with breathing mixture. To counter that positive buoyancy, divers use ballast belts containing metal weights and/or small sandbags carried in their harness. The bubbled neoprene suits add buoyancy but shrink under ambient pressure increasing with depth. To control the buoyancy more precisely, divers use a BCD (buoyancy control device), which functions as a gas bladder inflated as needed by use of the breathing gas mixture. The diving suit of the present disclosure may have significant added buoyancy due to the low density of the hollow glass microspheres (about 9 times smaller than seawater). The carrier polymer may have a density approximately equal to seawater, so it may not contribute significantly to buoyancy. The ceramics however have about 3 times the density of water, so they can counterbalance the added positive buoyancy. Hence, an appropriately tuned mixture of solid ceramics and hollow glass can result in neutrally buoyant suits, which would simplify the buoyancy control of the divers and require less attention focused on it during missions.

Face-densening in the context of the present disclosure may be analogous to face-hardened steel—denser microspheres to form a reflective layer over a thicker plate of hollow microspheres. The microspheres may be separately mixed in the same carrier prepolymer, then deposited sequentially in a mold. Curing in position may improve adhesion between layers. The combination could result in a first (e.g., front) layer more protective against blasts but less protective thermally working with a second layer more protective thermally but less against blasts.

It is also contemplated that consecutive layers of denser material alternating with less dense material set up the equivalent of Fabry-Perot cavity for mechanical waves. This may be analogous to optical high-pass and low-pass filters made by Bragg stacks. The result can be resonating cavities where specific waves of specific frequencies undergo a large number of reflections back and forth, resulting in increased absorption of specific frequencies. A Bragg stack equivalent could significantly attenuate a particular band of frequencies, increasing blast resistance.

Each composite plate may independently exhibit a variable thickness profile wherein the middle is made thicker to boost thermal protection, while the edges remain the same thickness, to retain ergonomics. Positioning of auxiliary zippers along the lower legs and lower arms would improve ease and speed of donning without compromising thermal protection and ergonomics. The composite can also be modified to a mixture of glass and ceramic microspheres to decrease the positive buoyancy of the suit and partially replace ballast belts and sand baggies with a more ergonomically distributed weight.

Thermal Protection

Disclosed, in some embodiments, is a thermally protective, ergonomic, depth-independent diving suit. The depth-independent thermal protection is provided by a layer of thermally resistive hard microspheres (e.g., glass microspheres) suspended in a carrier polymer, formed in composite pieces appropriately segmented to match diver anatomy and biomechanics, while providing good ergonomic properties.

The microspheres may be hollow glass and/or hollow ceramic microspheres, filled with vacuum, air, nitrogen, or noble gasses. Alternatively, the microspheres are solid glass and/or solid ceramic microspheres.

The carrier polymer may be a siloxane-containing polymer, a polyurethane, or a polyurea. In particular embodiments, the carrier polymer is a silicone polymer, such as polydimethylsiloxane.

FIG. 1 is a cross-sectional view of a portion of a non-limiting example of a diving suit 100 which exhibits enhanced thermal protection. The suit 100 includes a base layer 110 and a plurality of plates defined by a composite layer 120. The composite layer 120 includes hollow microspheres (e.g., glass microspheres) 140 dispersed in a carrier or matrix polymer 142. An outer layer 130 secures the composite layer 120 to the base layer 110. The outer layer 130 may be secured to the base layer 110 via stitching and/or an adhesive (e.g., glue). The outer layer 130 and the base layer 110 may be formed from the same or different materials. In some embodiments, the outer layer 130 and the base layer 110 are formed from neoprene.

Although a single composite layer 120 is depicted, it is also contemplated that each plate may contain multiple layers. The compositions of each plate may be the same or different.

The microspheres 140 may be packed to make up a volume of between about 5 vol % and about 74 vol % of the composite layer 120, including from about 10 vol % to about 55 vol %, from about 15 vol % to about 55 vol %, from about 20 vol % to about 55 vol %, from about 25 vol % to about 55 vol %, from about 30 vol % to about 55 vol %, from about 35 vol % to about 55 vol %, from about 40 vol % to about 55 vol %, from about 45 vol % to about 55 vol %, and from about 50 vol % to about 55 vol %.

The microspheres 140 may have a mean particle diameter in a range of about 1 µm to about 999 µm, including from about 5 µm to about 500 µm, from about 10 µm to about 200 µm, from about 15µ to about 150 µm, from about 20 µm to about 125 µm, from about 25 µm to about 100 µm, from about 30 µm to about 90 µm, from about 40 µm to about 80 µm, from about 50 µm to about 75 µm, and from about 60 µm to about 70 µm. In some embodiments, all of the microspheres have diameters within one of these ranges. It should be understood that the upper and lower limits of each range may be combined.

The composite layer 120 may have a thickness of from about 1 to about 100 times the microsphere particle diameter, including from about 2 to about 50, from about 3 to about 25, from about 4 to about 10, and from 5 to about 8. It should be understood that the upper and lower limits of each range may be combined.

Sonic and Blast Resistance

Disclosed, in some embodiments, is a sonic and/or blast protective diving suit. The sonic and/or blast protection is due to partial reflection of incident sonic waves through mechanical impedance mismatch between seawater and the material of the suit.

The sonic and/or blast protection may be achieved by including a composite layer containing spheres and/or microspheres in a carrier polymer formed (e.g., molded) to match the anatomy of the diver.

The microspheres may be hollow glass and/or hollow ceramic microspheres, filled with vacuum, air, nitrogen, or noble gasses.

Alternatively, the microspheres may be solid glass or solid ceramic microspheres.

The carrier polymer may be a siloxane-containing polymer or a polyurethane. In particular embodiments, the carrier polymer is a silicone polymer, such as polydimethylsiloxane.

Figure 2:
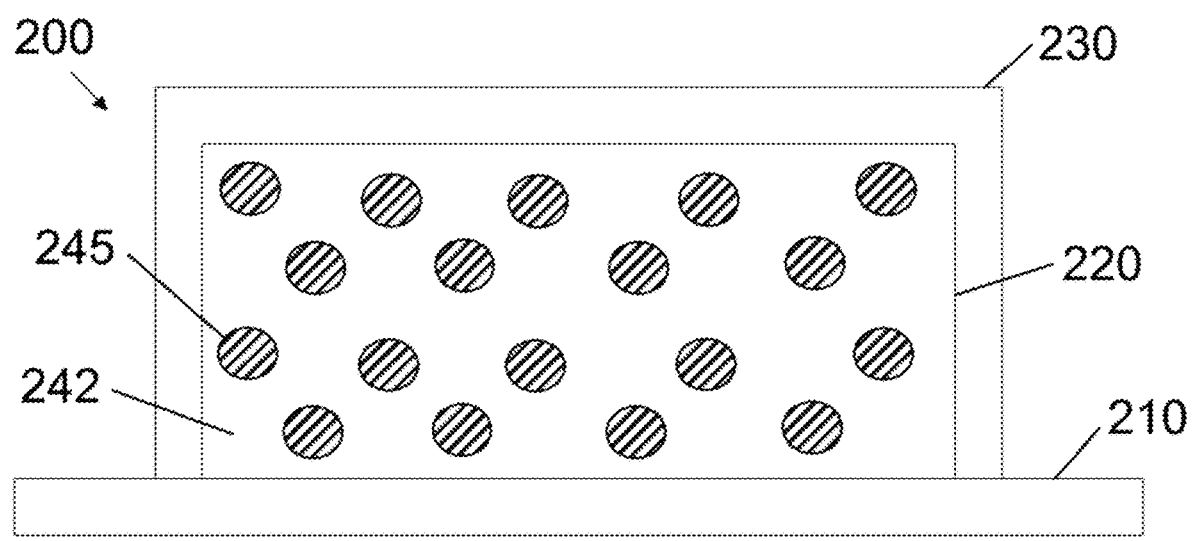
FIG. 2 is a cross-sectional view of a portion of another diving suit in accordance with some embodiments of the present disclosure.

FIG. 2 is a cross-sectional view of a portion of a non-limiting example of a diving suit 200 which exhibits enhanced sonic/blast protection. The suit 200 includes a base layer 210 and a plurality of plates defined by a composite layer 220. The composite layer 220 includes hollow or solid microspheres (e.g., solid ceramic microspheres) 245 dispersed in a carrier or matrix polymer 242. An outer layer 230 secures the composite layer 220 to the base layer 210. The outer layer 230 may be secured to the base layer 210 via stitching and/or an adhesive (e.g., glue). The outer layer 230 and the base layer 210 may be formed from the same or different materials. In some embodiments, the outer layer 230 and the base layer 210 are formed from neoprene.

In some embodiments, the ceramic microspheres 245 comprise a material having a Vickers Hardness of at least 15 or at least 30. The ceramic may be in the form of a carbide, an oxide, or a nitride in some embodiments. Non-limiting examples of ceramic materials include boron carbide ($B_4C$), aluminum oxide ($Al_2O_3$), silicon carbide (SiC), boron nitride (BN), silicon nitride ($Si_3N_4$), and zirconium oxide ($ZrO_2$).

The ceramic microspheres 245 may be packed to make up a volume of between about 5 vol % and about 74 vol % of the composite layer 120, including from about 10 vol % to about 55 vol %, from about 15 vol % to about 55 vol %, from about 20 vol % to about 55 vol %, from about 25 vol % to about 55 vol %, from about 30 vol % to about 55 vol %, from about 35 vol % to about 55 vol %, from about 40 vol % to about 55 vol %, from about 45 vol % to about 55 vol %, and from about 50 vol % to about 55 vol %.

The ceramic microspheres 245 may have a mean particle diameter in a range of about 1 µm to about 999 µm, including from about 5 µm to about 500 µm, from about 10 µm to about 200 µm, from about 15µ to about 150 µm, from about 20 µm to about 125 µm, from about 25 µm to about 100 µm, from about 30 µm to about 90 µm, from about 40 µm to about 80 µm, from about 50 µm to about 75 µm, and from about 60 µm to about 70 µm. In some embodiments, all of the ceramic microspheres have diameters within one of these ranges. It should be understood that the upper and lower limits of each range may be combined.

The composite layer 245 may have a thickness of from about 1 to about 100 times the microsphere particle diameter, including from about 2 to about 50, from about 3 to about 25, from about 4 to about 10, and from 5 to about 8. It should be understood that the upper and lower limits of each range may be combined.

The proposed solution is based on the idea that a mechanical wave traveling in a medium and impinging on a boundary to another medium, experiences partial reflection from the boundary. The reflection coefficient, or ratio between incident and reflected intensity, is based on the mechanical impedance mismatch between the two media. The impedance mismatch is based on the mass density mismatch. So, waves incident on a denser medium can experience significant reflection. The more energy is reflected, the less is transmitted into the second medium. So, if a diving suit contains material denser than water, at least in principle the suit ought to offer partial sonic and blast protection.

Wetsuits are often supplemented with neoprene dive hoods, which further increase the thermal protection around the diver's head. Hoods also have the ability to insulate the diver from loud underwater sounds due to the soundproofing characteristics of neoprene. Underwater sound itself is a result of vibrations and pressure fluctuations in the water. The compressional nature of sound waves means that sounds underwater travel much farther and faster than they otherwise would in air due to an increased density of the surrounding medium. Because of this, energy is transferred at a greater rate through the water, yielding a louder sound than what would be received in air.

A sound's "loudness" is generally established by its amplitude and is related to sound pressure and sound power. Sound power is most commonly measured via intensity, which is defined as the ratio of acoustic power to area (W/m²), or as pressure, which is the force of a sound on a surface (Pa). Both of these measurements can be expressed on the logarithmic decibel (dB) scale as Intensity Level (IL) and Sound Pressure Level (SPL), respectively.

$$IL = 10\log_{10}\frac{I}{I_{ref}} \quad (1)$$

$$SPL = 20\log_{10}\frac{p_{rms}}{p_{ref}} \quad (2)$$

Note that these formulae are different but mutually consistent, as intensity and power go like the square of the amplitude or pressure. As defined, the above ensure direct equality of the levels, regardless of the calculation being based on pressure/amplitude or power/intensity.

Previous studies have determined safe exposure limits for divers at various SPLs, as well as created distance and exposure time reference sheets for military use; these references show that hooded divers can tolerate higher SPLs and do so for slightly longer periods of time. A military diver's exposure limits become extremely important when faced with modernized diver deterrence techniques, such as swimmer neutralization equipment or active sonar systems. It is possible that adding additional shielding to a wetsuit and hood can increase the provided sound proofing effect, enabling higher exposure tolerances.

For soundproofing in diving applications, it is important to reference the human hearing threshold, which is between about 20 Hz and 11 kHz in air. This range is about the same underwater during bareheaded diving (without a hood or helmet). Adding a hood and full-face mask reduces this threshold to between 110 Hz and 1300 Hz. Note that the SPL values are the lowest discernable value.

Interestingly, different frequency bands impact the human body in different ways. Different frequency bands have been seen to produce various symptoms within human divers known as "bioeffects." Several branches of the Department of Defense have investigated such bioeffects, with study results being used to implement diver-neutralization techniques. Acoustic energy, applied at specific frequencies, amplitudes, and durations may affect the function and/or physical characteristics of major organs, limbs, or central nervous system in a measurable manner. These bioeffects, for example, can range from marginal discomfort to full auditory damage and tissue trauma.

Low Frequency Sonar (LFS) (100-500 Hz) generates high-energy pulses of sound which may be harmful at high power levels. High intensity LFS most commonly results in non-auditory effects, such as vertigo and dizziness, tingling, chest/lung tissue resonance effects, and muscle contractions within the body. While these effects are not necessarily fatal, the resultant discomfort will very likely cause the diver to abandon an operation or return to the surface. Navy testing determined safe operating limits, outlining a recommendation at 160-320 Hz with a maximum SPL of 160 dB re 1 µPa for no more than 100 seconds. Human testing saw physical aversion begin in divers within the LFS range at an SPL exceeding 140 dB, with most divers reporting a 'very severe' aversion level at the 100 Hz frequency. A summary of bioeffects from this study is show in Table 1 for the lower frequencies of 100 to 500 Hz and Table 2 for the range of 500 to 2500 Hz. It should also be noted that Navy regulations prohibit diver exposure at an SPL exceeding 215 dB, regardless of frequency or equipment used.

TABLE 1

Bio-Effects of Low Frequency Underwater Sound (100-500 Hz)

| SPL (dB re. 1 µPa) | Effect 100-500 Hz |
|---|---|
| 184+ | Based on animal models, liver hemorrhage and soft tissue damage are likely. |
| 170+ | Tolerance limit for divers and swimmers. Sound causes lung and body vibration. |
| 148-157 | The loudness and vibration levels become increasingly averse. Some divers will contemplate aborting an open water dive. |
| 140-148 | A small number of divers rate the sound as 'very severe.' |
| 136-140 | The sound is clearly audible. The majority of divers tolerate the sound well with only "slight" aversion. |
| 130 | Divers and swimmers able to detect body vibration. |
| 80-100 | Auditory threshold. |

TABLE 2

Bio-Effects of Underwater Sound (500-2500 Hz)

| SPL (dB re. 1 µPa) | Effect 100-500 Hz |
|---|---|
| 190+ | Hooded diver tolerance limit. |
| 167-185 | Tolerance limit for bareheaded divers and swimmers. Sound causes dizziness and disorientation. Divers in suit and hood are able to tolerate the sound well. |
| 155-166 | Divers tolerate these sounds well, although an increasing number of bareheaded divers indicate a 'severe' aversion rating. |
| 140-154 | Sound is clearly audible to divers. Sound is tolerated well with only slight aversion. |
| 100-140 | Divers hear underwater sound, but it is masked by exhaust bubble noise. |
| 80 | Hearing threshold for hooded divers. |
| 65 | Hearing threshold for bareheaded divers. |

Higher frequencies also produce varying impacts; In many cases, exposure above this LFS range resulted in auditory discomfort in divers between 500 and 2500 Hz. Certain frequencies are also seen to illicit dizziness and impact balance at SPLs above 150 dB. While much of this discomfort comes in the form of excessive loudness, there are studies that suggest resonance with internal organs.

Even higher frequencies in the Ultrasonic band (1-4 MHz) produce cavitation (bubble formation) and heating effects upon exposure. Tissue damage is known to occur if exposure is too long and at close enough ranges. Bubble formation is dependent on SPL and frequency, with bubbles beginning to collapse at high enough pressures and releasing energy upon compression. U.S. Navy studies have determined exposure ranges based on these effects, stating that a diver may not be closer than 10 yards when operating near a sound source exceeding 250 kHz. It should be noted, however, that power generated by ultrasonic signals is dissipated rapidly with distance, as well as that frequencies below 100 kHz produced negligible heating effects.

Figure 3:
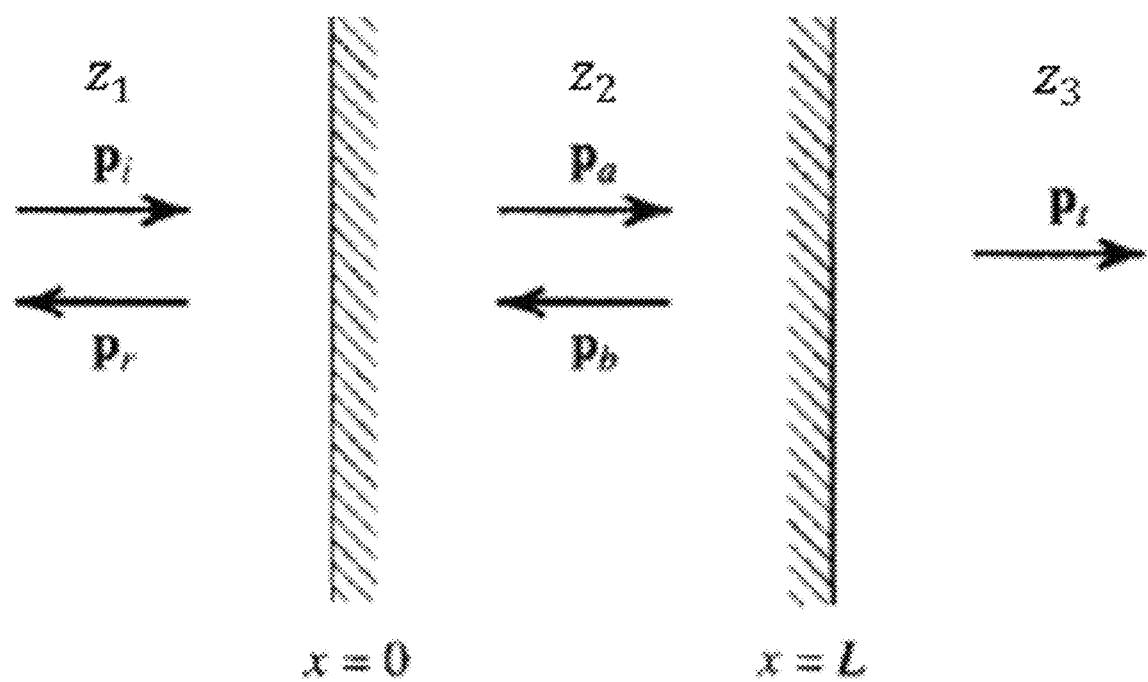
FIG. 3 is a schematic illustration of the transmission of a normal incidence sound signal on a fluid layer.

Basic laws govern the reflection and transmission of sound transitioning between mediums. The reflection and transmission coefficients of the resultant sound waves are derived from the acoustic boundary conditions. In this case, however, the transmission of the sound is not incident to a single boundary, but a layer. One approach is to simply model this as transmission though a fluid layer. FIG. 3 schematically illustrates the transmission of a normal incidence sound signal on a fluid layer. Although longitudinal waves may not be affected the same way, it is believed there would still be some beneficial effect to blast resistance.

Media impedances are given as $z_n$ and pressures are given as $p_i$, $p_r$, $p_t$ for incidence, reflection, and transmission, respectively. L denotes the thickness of the central layer.

Using a general expression for the incident signal, the waveform in the first medium can be expressed as $$p_i = P_i e^{j(\omega t - k_1 x)}, \quad (3)$$

where the wavenumber is given as $$k = \frac{2\pi}{\lambda} \text{ and } = \lambda = \frac{c}{f}.$$

Continuity of the specific acoustic impedance yields the pressure reflection coefficient and the intensity transmission coefficients:

$$R = \frac{\left(1 - \frac{z_1}{z_3}\right)\cos k_2 L + j\left(\frac{z_2}{z_3} - \frac{z_1}{z_2}\right)\sin k_2 L}{\left(1 + \frac{z_1}{z_3}\right)\cos k_2 L + j\left(\frac{z_2}{z_3} - \frac{z_1}{z_2}\right)\sin k_2 L} \quad (4)$$

$$T_I = \frac{4}{2 + \left(\frac{z_3}{z_1} + \frac{z_1}{z_3}\right)\cos^2 k_2 L + \left(\frac{z_2^2}{z_1 z_3} + \frac{z_1 z_3}{z_2^2}\right)\sin^2 k_2 L} \quad (5)$$

This can be further reduced if the first and third fluids are the same. In the case of this experiment, the density of the human body is roughly the same as the surrounding seawater, making this an acceptable approximation:

$$T_I = \frac{1}{1 + \frac{1}{4}\left(\frac{z_2}{z_1} - \frac{z_1}{z_2}\right)^2 \sin^2 k_2 L} \quad (6)$$

Furthermore, if $z_2 \gg z_i$, or the impedance of the second medium is much larger than that of the first, the intensity transmission coefficient reduces further.

$$T_I = \frac{1}{1 + \frac{1}{4}\left(\frac{z_2}{z_1}\right)^2 \sin^2 k_2 L} \quad (7)$$

If the wavelength of the sound wave is large compared to the thickness L of the protection, the sine will approach zero and the intensity transmission coefficient will approach unity. The result would be little to no protection. However, if the wavelength is comparable to the thickness L, or smaller than L, then the sine would not be small in general. Then, for a protective layer made of ceramics of density close to three times the density of seawater, the transmission can fall down to ⅓, offering significant reduction in transmitted intensity and associated reduction in damage to the diver.

Since blasts can be thought of as sharp pulses in spatial domain, they are by necessity wide in frequency domain. The above analysis suggests that for at least frequencies higher than a certain threshold, the suit could offer significant damage reduction by increased reflection. Because total transmitted energy would ultimately be an integral over the power density in frequency domain, it follows that that integral could be significantly reduced by decreasing the transmitted power density at frequencies beyond the threshold. This is the basis of the suggested sonic/blast protection effect.

Ballistic Control

Disclosed, in some embodiments, is a ballistically-protective diving suit. The ballistic protection is achieved by including a composite layer containing large solid spheres tightly packed and arranged (e.g., in a hexagonal pattern) in one or more layers.

The composite layer may be molded into pieces segmented to match the anatomy of the diver.

The spheres may be solid ceramic (e.g., boron carbide) spheres.

The carrier polymer may be a siloxane-containing polymer, a polyurethane, or a polyurea. In particular embodiments, the carrier polymer is a silicone polymer, such as polydimethylsiloxane.

Special forces in particular would like to have multipurpose equipment that combines several features, including ballistic protection. Including large ceramic spheres inside the composite pieces of the described suit would trade off some thermal protection to gain significant ballistic protection. The ceramic of the ballistic protection is partially thermally protective as well, though not to the same extent as hollow microspheres. Also, the ceramic spheres of ballistic protection should also offer partial sonic/blast protection as well, since the density of the ceramic is significantly larger than the density of seawater.

Ceramics are brittle or quasi-brittle materials used in a vast range of applications, which include body and vehicle armors. The basic idea is to arrange ceramic spheres of appropriate size in a tightly packed layer, e.g., in a hexagonal matrix pattern, so that incoming projectiles are slowed down, deflected, and dulled. A major component of the armor-piercing capability of modern rifle rounds is a pointed solid core of hardened steel. For example, the Russian 7.62×39 mm intermediate cartridge 7N23 round was introduced in 2002 and has a sharp-pointed steel penetrator designed to defeat personal armor. A defensive counter to the sharpened penetrator is to meet the round with a hard surface positioned at an angle. That would tend to turn the round sideways and significantly decrease its penetration capability by greatly increasing the cross-sectional area of interaction. As a result, significantly less pressure is required over the increased area, to produce sufficient force to decelerate the round. Because there is no guarantee as to the exact location of initial impact, a matrix of tightly packed spheres is a good solution as it provides an angled contact surface that is a large percentage of the overall area to be protected.

Figure 4:
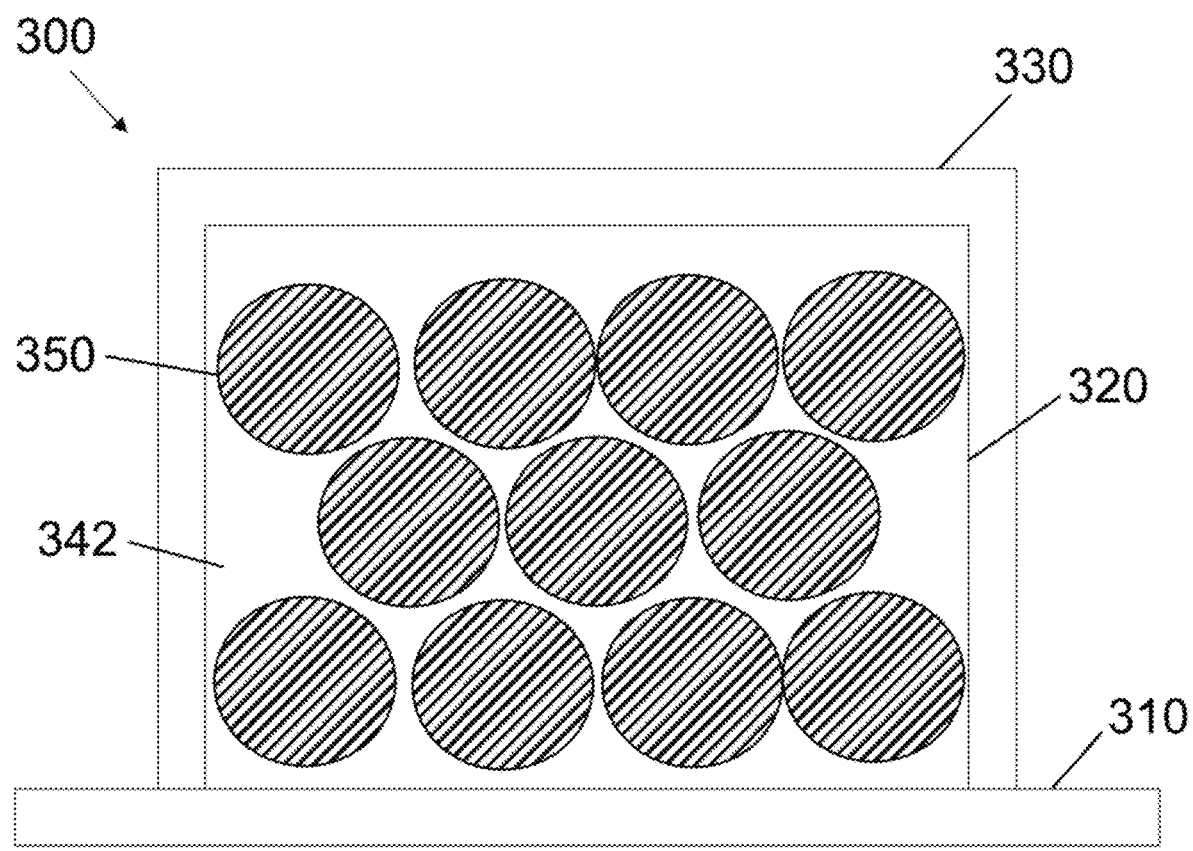
FIG. 4 is a cross-sectional view of a portion of a further diving suit in accordance with some embodiments of the present disclosure.

FIG. 4 is a cross-sectional view of a portion of a non-limiting example of a diving suit 300 which exhibits enhanced ballistic resistance. The suit 300 includes a base layer 310 and a plurality of plates defined by a composite layer 320. The composite layer 320 includes solid spheres (e.g., ceramic spheres) 350 dispersed in a carrier or matrix polymer 342. The ceramic spheres 350 may be arranged in a hexagonal close packed (HCP) geometric arrangement substantially parallel to the base layer 310. In this arrangement, the spheres share a common plane and are patterned so that six neighboring spheres flank each non-edge counterpart. The ceramic spheres 350 may be arranged in a single layer or multiple layers may be stacked (e.g., three layers depicted in FIG. 4). An outer layer 330 secures the composite layer 320 to the base layer 310. The outer layer 330 may be secured to the base layer 310 via stitching and/or an adhesive (e.g., glue). The outer layer 330 and the base layer 310 may be formed from the same or different materials. In some embodiments, the outer layer 330 and the base layer 310 are formed from neoprene.

In some embodiments, the ceramic spheres 350 exhibit a Vickers Hardness of at least 15 or at least 30. The ceramic may be in the form of a carbide, an oxide, or a nitride in some embodiments. Non-limiting examples of ceramic materials include boron carbide ($B_4C$), aluminum oxide ($Al_2O_3$), silicon carbide (SiC), boron nitride (BN), silicon nitride ($Si_3N_4$), and zirconium oxide ($ZrO_2$).

The ceramic spheres 350 may be packed to make up a volume of between about 5 vol % and about 74 vol % of the composite layer 120, including from about 10 vol % to about 55 vol %, from about 15 vol % to about 55 vol %, from about 20 vol % to about 55 vol %, from about 25 vol % to about 55 vol %, from about 30 vol % to about 55 vol %, from about 35 vol % to about 55 vol %, from about 40 vol % to about 55 vol %, from about 45 vol % to about 55 vol %, and from about 50 vol % to about 55 vol %.

The ceramic spheres 345 are generally larger than the microspheres discussed herein but may still themselves be microspheres. The ceramic spheres 345 may have a mean particle diameter in a range of about 0.1 inch to about 1.0 inches, including from about 0.375 inch to about 0.75 inch. In some embodiments, all of the ceramic spheres have diameters within one of these ranges. It should be understood that the upper and lower limits of each range may be combined.

The composite layer 320 may have a thickness of from about 1 to about 10 times the microsphere particle diameter, including from about 1.1 to about 5, from about 1.2 to about 4, from about 1.3 to about 3, and from 1.4 to about 2. It should be understood that the upper and lower limits of each range may be combined.

Additional potential aspects of ballistic protection are described in U.S. Pub. No. 2019/0041168 A1 titled "Body Armor of Ceramic Ball Embedded Polymer," the content of which is incorporated by reference herein in its entirety.

Thermal Resistance, Sonic and Blast Resistance, and Ballistic Resistance

Diving suits providing one or more of the aforementioned benefits are also disclosed. Disclosed, in some embodiments, is a diving suit combining depth-independent thermal protection, sonic/blast protection, and ballistic protection. The thermal protection is provided by thermally resistive spheres and/or microspheres suspended in carrier polymer, the sonic/blast protection is provided by mechanical impedance mismatch between seawater and the material of components of the suit, and ballistic protection is provided by large solid spheres suspended in carrier polymer.

The thermally resistive material may be hollow glass microspheres, hollow ceramic microspheres, and/or solid ceramic microspheres.

The carrier polymer may be a siloxane-containing polymer, a polyurethane, or a polyurea. In particular embodiments, the carrier polymer is a silicone polymer, such as polydimethylsiloxane.

The beneficial properties may be achieved using a monolayer composite or a multilayer composite.

In some embodiments, the composite pieces of the suit are built in layers. An outermost layer contains ceramic microspheres suspended in a carrier polymer to provide primarily sonic protection. A middle layer may be a mixture of tightly packed solid ceramic spheres offering primarily ballistic protection, suspended in a mixture of hollow glass microspheres and carrier polymer. An innermost layer may contain hollow glass microspheres suspended in carrier polymer and providing primarily thermal protection.

Figure 5:
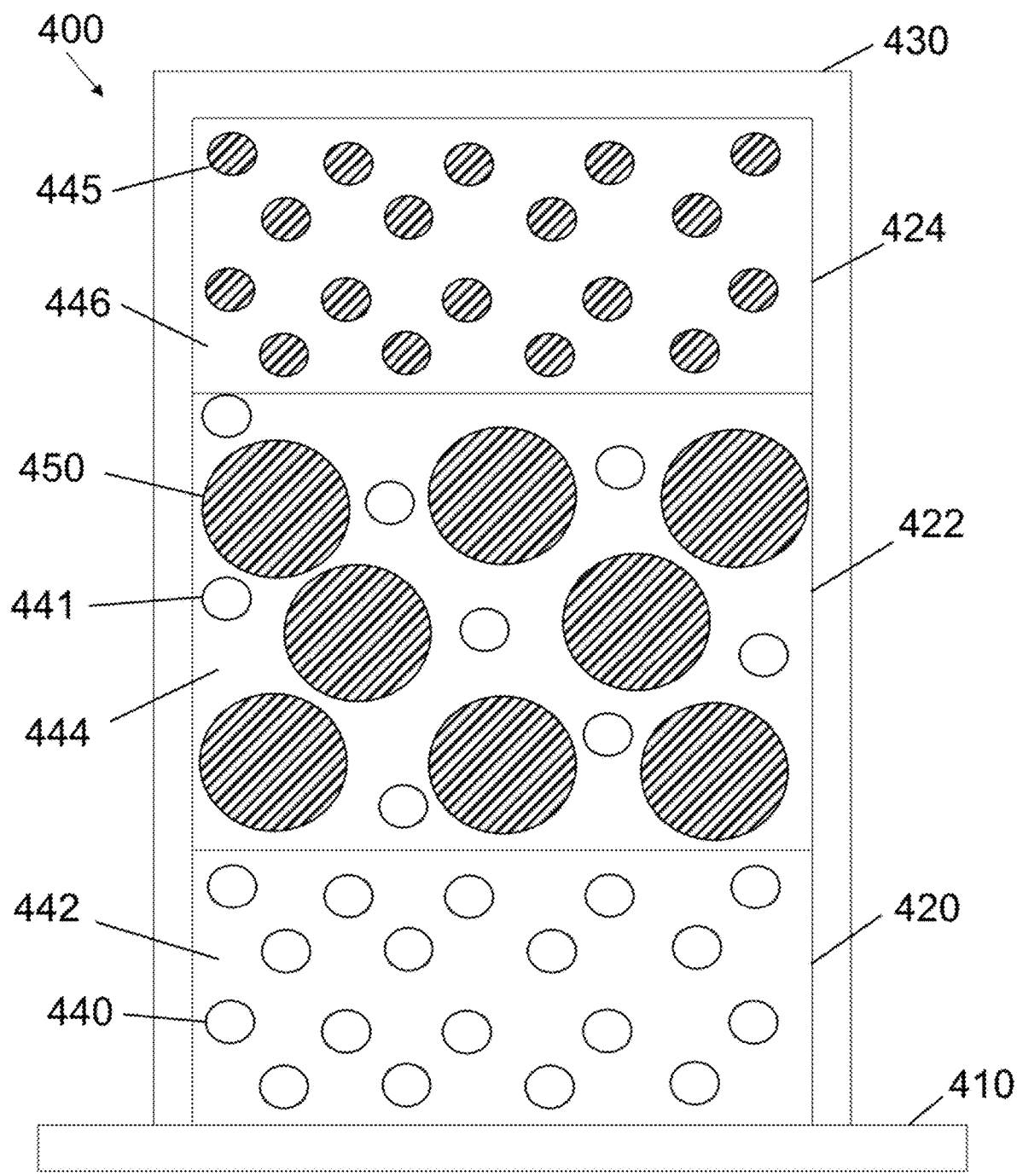
FIG. 5 is a cross-sectional view of a portion of a different diving suit in accordance with some embodiments of the present disclosure.

FIG. 5 is a cross-sectional view of a portion of a non-limiting example of a diving suit 300 which exhibits enhanced thermal properties, sonic/blast resistance, and ballistic resistance. The suit 400 includes a base layer 410 and a plurality of plates defined by a composite layers 420, 422, 424. The composite layer 420 includes hollow microspheres (e.g., glass microspheres) 440 dispersed in a carrier or matrix polymer 442. The composite layer 422 includes solid spheres (e.g., ceramic spheres) 450 and includes hollow microspheres (e.g., glass microspheres) 441 dispersed in a carrier or matrix polymer 444. The hollow microspheres 440, 441 may be the same or different in terms of composition and size. The carrier polymers 442, 444 may be the same or different in terms of composition and/or properties. The composite layer 424 includes ceramic microspheres (solid or hollow) 445 dispersed in a carrier or matrix polymer 446. Carrier polymer 446 may be the same as or different from carrier polymers 442, 444. An outer layer 430 secures the plate to the base layer 410. The outer layer 430 may be secured to the base layer 410 via stitching and/or an adhesive (e.g., glue). The outer layer 430 and the base layer 410 may be formed from the same or different materials. In some embodiments, the outer layer 430 and the base layer 410 are formed from neoprene.

The ceramic spheres 450 may be arranged in a hexagonal close packed (HCP) geometric arrangement substantially parallel to the base layer 410. In this arrangement, the spheres share a common plane and are patterned so that six neighboring spheres flank each non-edge counterpart. The ceramic spheres 450 may be arranged in a single layer or multiple layers may be stacked (e.g., three layers depicted in FIG. 5).

In some embodiments, the ceramic spheres 450 and/or ceramic microspheres 445 exhibit a Vickers Hardness of at least 15 or at least 30. The ceramic may be in the form of a carbide, an oxide, or a nitride in some embodiments. Non-limiting examples of ceramic materials include boron carbide ($B_4C$), aluminum oxide ($Al_2O_3$), silicon carbide (SiC), boron nitride (BN), silicon nitride ($Si_3N_4$), and zirconium oxide ($ZrO_2$). The ceramic microspheres 445 and ceramic spheres 450 may be made from the same or different ceramic materials.

The layer facing the water 430 may include a thin neoprene layer for watertightness and mechanical containment (e.g., to keep the composite plate in position with respect to the underlying thin neoprene suit). This can be done by gluing external pockets of neoprene onto an existing neoprene suit 410, wherein the pockets seal the composite piece in and prevent water moving in and out of the pocket.

The next layer inward is composite layer 424 containing solid ceramic microspheres suspended in a carrier polymer, e.g., polydimethylsiloxane. The solid microspheres provide molding capability, partial thermal protection (though hollow glass microspheres are more insulating), and sonic protection due to the increased density and thus a jump up in the mechanical impedance. Sonic waves reaching this layer will undergo partial reflection. Composite layer 424 may also partially dull or change a trajectory of a projectile, although that is not their primary purpose.

The next layer inward is composite layer 422 containing a mixture of large ceramic spheres, hollow glass microspheres, and carrier polymer. The primary purpose of this layer is ballistic protection offered by the large solid ceramic spheres. However, the layer would also serve as partial sonic protection and thermal protection in conjunction with the previous layer.

The next layer inward is composite layer 420 containing hollow glass microspheres suspended in carrier polymer. The primary purpose of this layer is thermal protection. The hollow glass microspheres are more thermally resistive than the solid ceramics. While the other layers provide a measure of thermal protection as well, this layer is likely to be the most important in terms of thermal protection offered per unit thickness of the layer.

The final layer inward is a thin neoprene base layer 410, e.g., the thin neoprene suit utilized as a water-tight body glove and support harness for the composite pieces.

The volume percent of spheres/microspheres in each composite layer, particle diameters, and composite layer thicknesses may be as described above.

The body is significantly warmer than the surrounding seawater. So, heat flows from the body to the water. The thermal protection offered by the suit impedes the heat flow and thus decreases the heat loss.

Diving Suit Production

The ergonomics of the diving suit may be improved relative to conventional diving suits in part due to the use of a thin base layer in combination with composite plates which due not inhibit movement due to their locations. Furthermore, superior fit to the wearer may be achieved by 3D-scanning of the body of the diver. Ergonomic segmentation may be achieved via digitally segmenting the images along anatomical lines (e.g., boundaries between major muscle groups and/or boundaries between areas of little or no bending in the human body, such as the rib cage and major bones and/or along major joints). The production of the composite pieces may be achieved by converting the segmented 3D scans into digital designs of corresponding molds, e.g., 3D-printed molds, and casting the composite mixtures into these molds. Production of the composite pieces may be achieved by direct 3D printing of the composite mixture based on the digital segmentation of the 3D body scans and/or using a mold.

Figure 6:
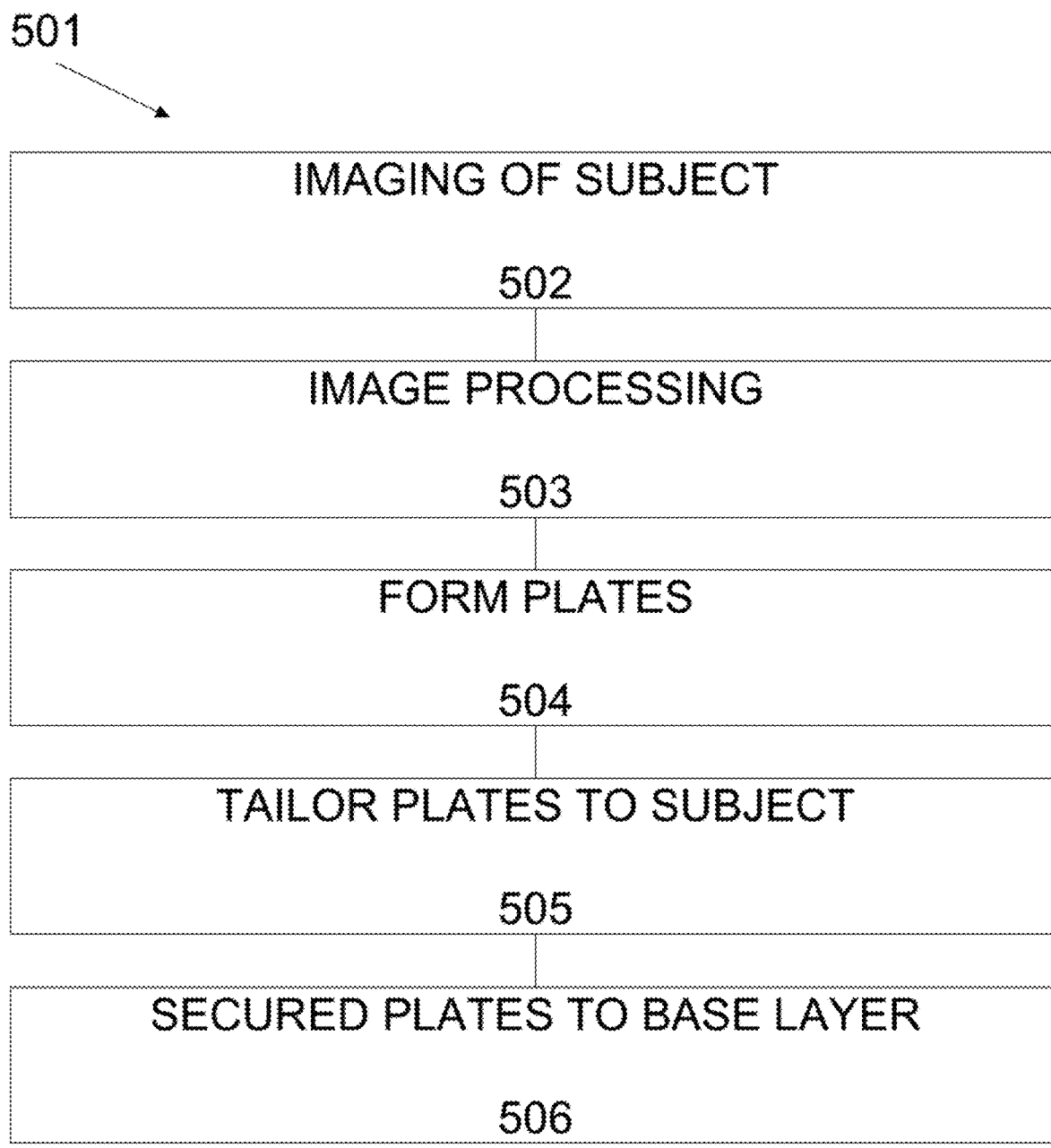
FIG. 6 is a flow chart illustrating a method for forming a diving suit in accordance with some embodiments of the present disclosure.

FIG. 6 is a flow chart illustrating a non-limiting example of a method 501 in accordance with some embodiments of the present disclosure.

The method 501 includes obtaining measurements of a subject (e.g., imaging the subject/diver 502). This may be performed using a 3D-scanner on the subject.

Next, the obtained measurements and/or imaging may be processed 503. Composite plates are formed 504 based on the processed data/imaging. The plates may be tailored 505 to the subject. Tailoring 505 may involve making minor adjustments to the size and/or shape of one or more plates to enhance flexibility and mobility of the diving suit. The plates may then be secured to the base layer 506.

The following examples are provided to illustrate the devices and methods of the present disclosure. The examples are merely illustrative and are not intended to limit the disclosure to the materials, conditions, or process parameters set forth therein.

EXAMPLES 3D body scans of divers wearing thin neoprene suits were generated by a portable scanner attached to an iPad. The resulting large files were uploaded in MeshLab (an open-source image processing software). The images were then cut in MeshLab to produce individual segments. The resulting segments were digitally smoothened using the "Quadratic Edge Collapse Decimation" function. The smoothened segments were individually converted to STL format and exported to SolidWorks, where each segment was further cleaned using the "trim" tool, to remove unnecessary artifacts, such as protrusions, sharp points, and jagged edges.

The suit may be made of a thin neoprene suit used as a body glove on which pieces of thermally resistive composite are externally attached. Since the composite is less flexible than neoprene, it is even more important that the composite is well-fitted to the body. Hence, the composite pieces were on 3D body scans of the diver dressed in a thin neoprene suit. The scans were then digitally cut into individual segments corresponding to the areas to be covered by the composite. The cuts were designed to follow the anatomic gaps between major muscle groups and the areas of large bending on the body. In that way, a monolithic composite piece would cover an area that experiences little to no bending. This approach maximizes the thermal protection coverage while maintaining good ergonomics.

The cuts transformed the scans into individual segments, each corresponding to a composite piece to be cast later. The high resolution of the 3D scanner was not necessary for the suit, while the resulting files were still too large to manage easily in a 3D software environment. So, each segment was smoothened and trimmed within the software. That significantly decreased the surface roughness and file size, cleaned scan artifacts, and improved digital handling. The smoothening lowered the number of triangular meshes forming the image, which made subsequent 3D printing simpler and faster. Finally, the scaling of the smoothening was small enough (about 1 mm) that it did not compromise the quality of the fit to the diver body.

For each segment, the resulting 3D surface in SolidWorks was copied, pasted, and offset by 8 mm in the normal outward direction to the approximate center of the surface. The design was then extended by use of "extrude" and "draw" functions to form a rectangular box completely encompassing the mold gap volumetrically. A lid was added to the top piece and a lip to the bottom, to ensure that upon snug assembly, the mold would preserve the 8 mm spacing between the casting surfaces. The edges of the box were smoothened using the "fillet" function. Vent shafts of 3 mm diameter were installed in the top half of the mold, using the "extrude cut" function. The final mold design files were saved in STL format.

Each segment was a digital surface in 3D. To convert this into a mold design, the surface was copied, pasted, and offset by 8 mm in the normal outward direction from the approximate center of the surface. The resulting two surfaces would define the mold gap and thus the future composite cast. The 8 mm spacing was chosen as a compromise between protection and bulkiness, as well as to simplify comparison to 8 mm neoprene suits. The two surfaces were then outwardly extended to form a rectangular box for the emerging mold. A lid was added to the top piece, while a lip was added to the bottom piece. These additions ensured that when assembled, the two pieces of the mold would fit snugly while preserving the 8 mm gap between the casting surfaces. Then, the edges of the box were digitally smoothened to prevent paper cuts during subsequent manual handling of the molds. Finally, vent shafts of 3 mm diameter were installed in the top half of the mold, to allow escape of trapped air during subsequent mold assembly and casting.

The mold halves were 3D-printed in polycarbonate. It is hard and sturdy, and does not stick appreciably to the composite, making it a good material for the mold. The chosen printer setting was "half-density," which economized toner while still providing sufficient structural strength to the mold.

The two halves of each mold were printed in polycarbonate on a Fortis 400mc 3D printer at half-density mesh setting.

Silicone prepolymer was prepared by mixing about 100 g Parts A and about 10 g Part B of SYLGARD™ 184 (1.1 lbs. kits from Dow Corning) in a 310 mL mixing cup in ARE-310 planetary rotary mixer (THINKY, Japan) at 1500 rpm for 4 min. K1 hollow glass microspheres (3M Corp.) were added at about 170 mL to the cup. The mixing cup was then resealed and spun at 1500 rpm for 4 minutes.

The cup is rotated around its symmetry axis tilted with respect to the vertical, while the entire assembly rotates around a vertical axis. The result is a rapid sloshing motion producing a bladeless stirring that avoids damage to the microspheres. Stoichiometric ratios between monomer and crosslinker were used, while the final volumetric concentration of microspheres was close to saturation (about 55%), to maximize thermal resistivity. The mixture was degassed first by centrifugation and then by applying vacuum in a desiccator.

To cast a composite segment, the contents of multiple cups were poured into the same lower half mold, to provide sufficient volume. The mold lid was replaced and fit snugly to the lower half's lip. Trapped air escaped through the vents on the lid, while excess material climbed about halfway up the shafts. The assembled mold was baked to cure the silicone, then cooled down to room temperature. The cast was extracted from the mold and cleaned of artifacts, while the mold was cleaned and reclaimed for reuse. Each segment had its own mold and followed the same fabrication procedure.

Multiple such cups were prepared and placed in a desiccator attached to a mechanical rough vacuum pump, where they were degassed for 5 minutes. Then their contents were poured into the lower half of the mold. The mold lid was replaced and pushed down to fit snugly to the lip of the lower half. The assembled mold was baked for 2 hours in a VWR Forced Air Oven at 80° C. The mold was taken out of the oven and allowed to cool to room temperature before extracting the ready cast. The cast was cleaned up of molding artifacts, while the mold was cleaned of debris. Slugs of excess composite were removed from the vent shafts.

Cast composite segments were fitted to the diver. The segments were trimmed for best fit and ergonomics of swimming motions. Their location was marked on the 3 mm suit while the suit was worn. After the suit was taken off, thin neoprene pieces were traced off the drawn marks to produce external pockets fitting the segments. The pockets were attached to the 3 mm suit by gluing three of the four sides. The segments were inserted into the pockets and then the fourth side of each pocket was sealed by gluing. This completed the assembly of the suit.

The segments were fitted onto a 3 mm neoprene suit while worn by the diver. Final trimming was performed to maximize the quality of the fit without removing too much composite material. In particular, the left and right pectorals were trimmed to have a gap between them along the breastbone, to allow forward strokes with the arms. A gap was built in between the two halves of the upper back, to accommodate the suit zipper running along the spine and to allow for backward strokes. A gap was built in between pectorals and abdominals to allow for abdominal flexing and forward bending of the torso. The lower back segment was cut into two halves to accommodate the suit zipper running along the spine. The resulting segments covered the front and back of the torso, the front and back of the upper legs, and the outer half of the lower legs. Thus, the overall design struck a tradeoff between maximized coverage for thermal protection and good ergonomics to allow for easy swimming motions.

The problem of attaching the segments to the 3 mm suit was initially tackled chemically, including neoprene glues, kits from LORD Corp., and custom preps. None produced satisfactory bonding, likely due to a variety of reasons: the chemical inertness of glass and silicone, insufficient strength of adhesion, differing stiffness of the bonding materials, and the requirement to retain adequate flexibility for ergonomic wear.

A good alternative solution was found in encapsulating the composite segments in external pockets made of thin neoprene. The pockets were attached and sealed by gluing neoprene on neoprene. The sealed pockets retained the composite and prevented water from traveling in and out, which would have increased heat loss.

Figure 7A:
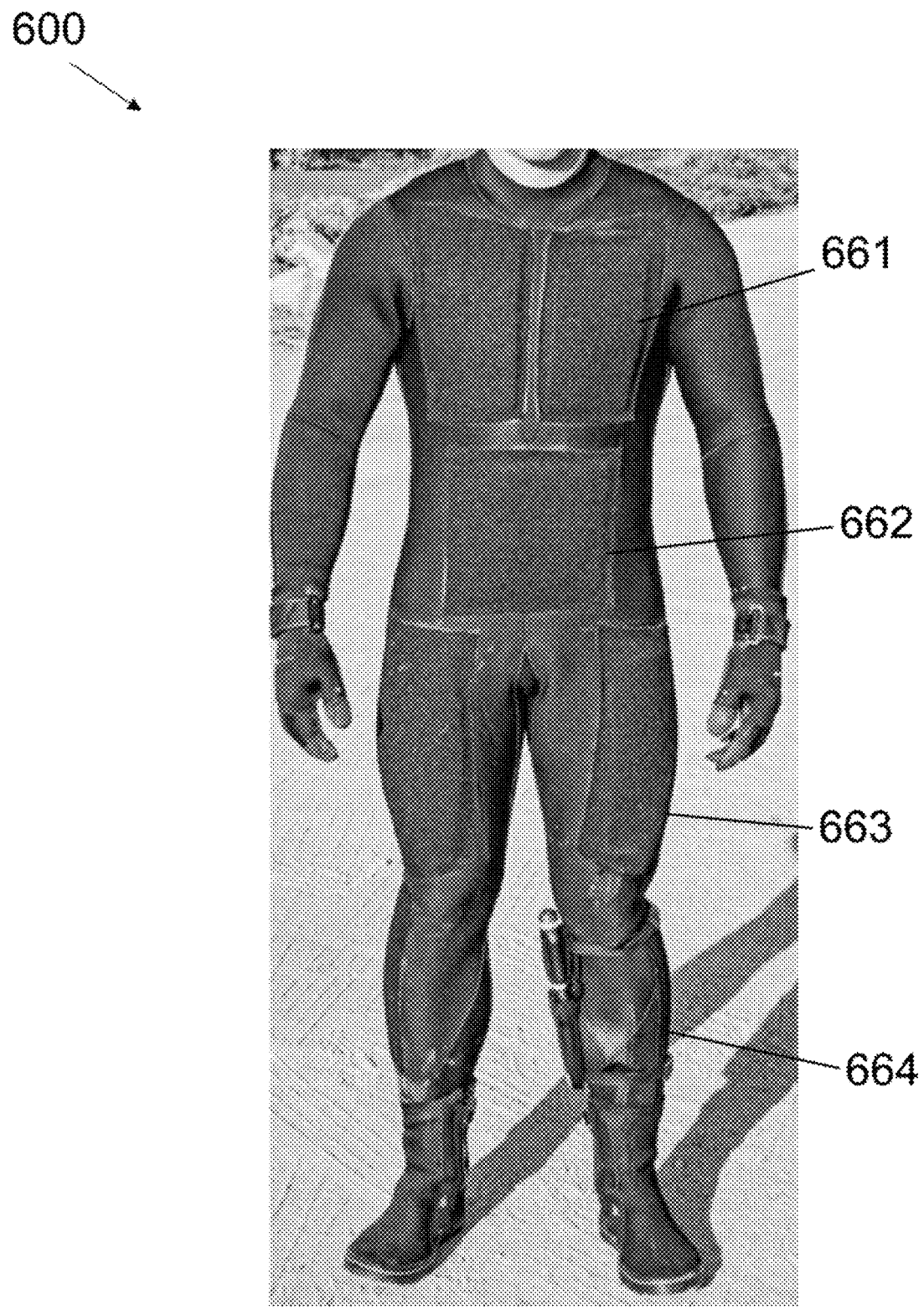
FIG. 7A is a front view black and white photograph of a diving suit discussed in the Examples section.
Figure 7B:
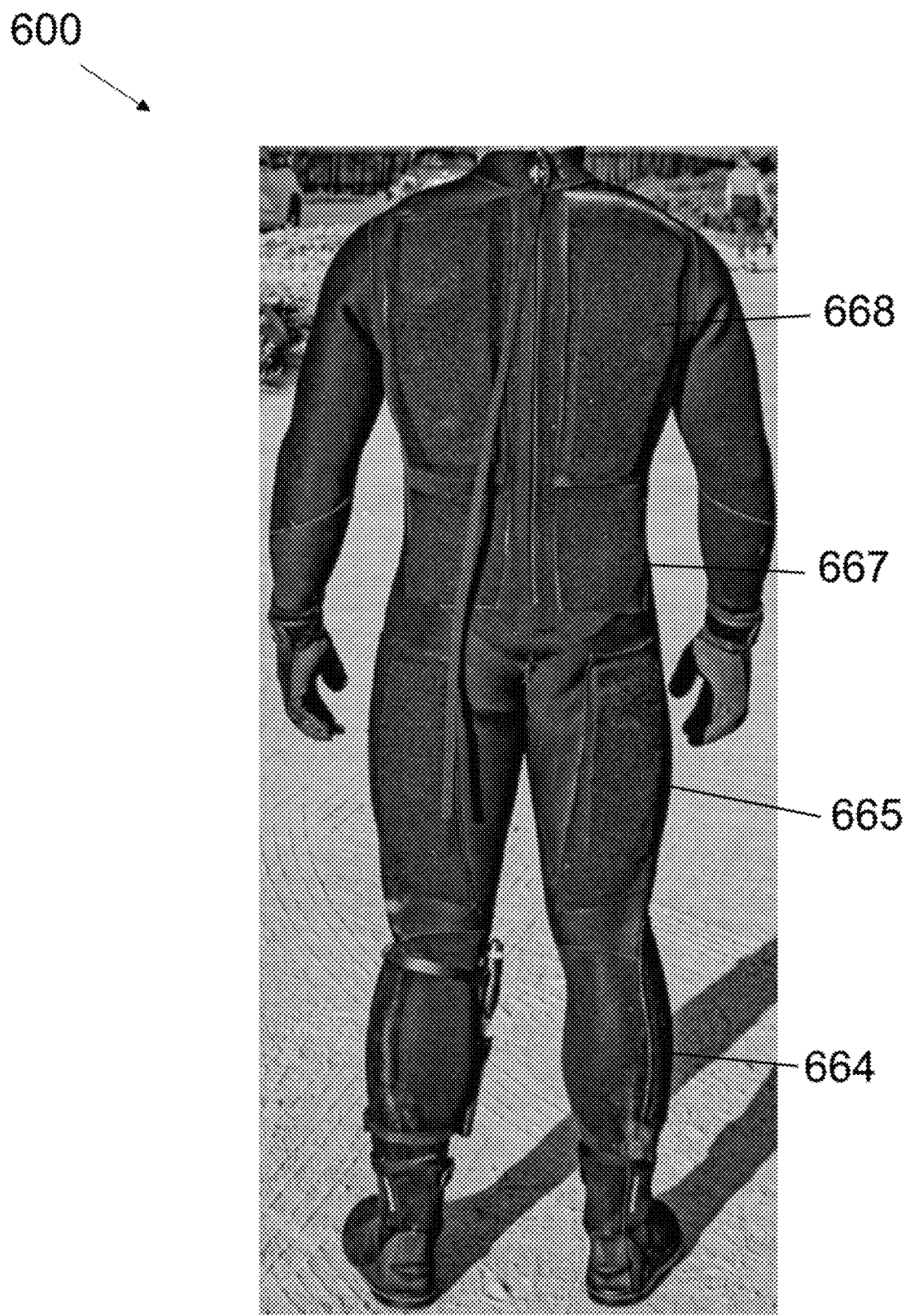
FIG. 7B is a back view black and white photograph of the diving suit of FIG. 7A.

FIGS. 7A and B are black and white photographs of the suit 600 used in testing. The suit 600 included two chest plates 661, an abdominal plate 662, two front upper leg plates 663, two outer lower leg plates 664, two rear upper leg plates 665, two lower back plates 667, and two upper back plates 668. Although the testing diving suit 600 did not include a hood, it should be understood that a unitary or non-unitary hood is also contemplated. Such a hood may include one or more composite plates. In particular embodiments, the hood includes at least one composite plate for covering each ear and containing ceramic microspheres for sonic resistance. Upper and lower arm composite plates and inner lower leg composite plates are also contemplated.

The resulting suit was tested in Monterey Bay in about 50° F. sea water at depths of up to 30 feet. The suit wearer dove with a diving partner who wore a standard 7 mm neoprene suit. Automated dataloggers were worn inside and outside the suits. The loggers digitally recorded both temperature and pressure every 0.1 second over 24 hours.

Experimental results from the field testing were plotted. The data were plotted in terms of the difference between inside and outside temperatures for each diver, the difference of the difference, and the depth for each diver based on the simultaneous measurements of ambient pressure. The results show that the suit achieved approximately +7° F. advantage over the standard 7 mm neoprene suit. Furthermore, the suit had the ergonomics of a 3 mm suit, which is significantly better than the 7 mm suit. Hence, the suit outperformed the standard thick neoprene suit in both thermal protection and ergonomics.

The pressure data converted into calculated depth of salt water in feet indicate that the 7 mm wearer spent more time at smaller depth than the suit wearer. Since neoprene insulation worsens with depth, it follows that the suit thermal advantage ought to be even larger.

The results show the suit outperformed a commercial 7 mm neoprene suit in both thermal protection (+7° F. warmer) and ergonomics (equivalent to a 3 mm suit). Hence, the presented suit has high practical utility.

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A segmented diving suit comprising:
   a base layer;
   a plurality of composite plates; and
   a plurality of cover layers, each cover layer being associated with one composite plate of the plurality of composite plates;
   wherein each composite plate is located between the base layer and one cover layer of the plurality of cover layers, and each composite plate comprises:

a first composite layer comprising hollow glass microspheres dispersed in a first carrier polymer; and wherein each composite plate of the plurality of composite plates is arranged to avoid covering joints of a diver.

2. The segmented diving suit of claim 1, wherein the first carrier polymer comprises a siloxane-containing polymer, a polyurethane, or a polyurea.

3. The segmented diving suit of claim 1, wherein the first carrier polymer comprises a silicone polymer.

4. The segmented diving suit of claim 1, wherein each composite plate further comprises:

a second composite layer located between the cover layer and the first composite layer, the second composite layer comprising ceramic spheres dispersed in a second carrier polymer.

5. The segmented diving suit of claim 4, wherein the first carrier polymer and the second carrier polymer are the same.

6. The segmented diving suit of claim 4, wherein the second composite layer further comprises hollow glass microspheres.

7. The segmented diving suit of claim 4, wherein each composite plate further comprises:

a third composite layer located between the cover layer and the second composite layer, the third composite layer comprising ceramic microspheres dispersed in a third carrier polymer.

8. The segmented diving suit of claim 7, wherein the first carrier polymer, the second carrier polymer, and the third carrier polymer are the same.

9. The segmented diving suit of claim 1, wherein the base layer and the cover layer comprise neoprene; and wherein a perimeter of the cover layer is secured to the base layer via an adhesive.

10. The segmented diving suit of claim 1, wherein a central portion of the composite plate is thicker than an edge of the composite plate.

11. A segmented diving suit comprising:

a base layer; and a plurality of composite plates, each composite plate comprising at least one composite layer containing spheres and/or microspheres embedded in a carrier polymer;

wherein each composite plate of the plurality of composite plates is arranged to avoid covering joints of a diver.

12. The segmented diving suit of claim 11, wherein the microspheres are hollow glass microspheres.

13. The segmented diving suit of claim 12, wherein the hollow glass microspheres are filled with a composition comprising nitrogen, air, or a noble gas.

14. The segmented diving suit of claim 11, wherein the microspheres are ceramic microspheres.

15. The segmented diving suit of claim 11, wherein the spheres are ceramic spheres.

16. The segmented diving suit of claim 1, wherein the first carrier polymer comprises a siloxane-containing polymer, a polyurethane, or a polyurea.

17. A process for producing a segmented diving suit comprising:

three-dimensionally scanning a diver;

image processing images produced during the three-dimensional scanning;

forming a plurality of composite plates designed along anatomical lines of the diver; and securing the composite plates to a base layer;

wherein each composite plate of the plurality of composite plates comprises:

a first composite layer comprising hollow glass microspheres dispersed in a first carrier polymer.

18. The process of claim 17, wherein the composite plates are secured to the base layer by adhesively securing a plurality of cover layers to the base layer, each cover layer being associated with one of the plurality of composite plates.

19. The process of claim 17, wherein the composite plates are formed via 3D printing.

20. The process of claim 17, wherein each composite plate further comprises:

a second composite layer located between the cover layer and the first composite layer, the second composite layer comprising ceramic spheres dispersed in a second carrier polymer; and a third composite layer located between the cover layer and the second composite layer, the third composite layer comprising ceramic microspheres dispersed in a third carrier polymer.

* * * * *